United States Patent [19]

Telldén

[11] Patent Number: 5,622,084
[45] Date of Patent: Apr. 22, 1997

[54] INDUSTRIAL ROBOT

[75] Inventor: Leif Telldén, Västerås, Sweden

[73] Assignee: ASEA Brown Boveri AB, Västerås, Sweden

[21] Appl. No.: 608,033

[22] Filed: Feb. 28, 1996

Related U.S. Application Data

[63] Continuation of Ser. No. 194,476, Feb. 10, 1994.

[30] Foreign Application Priority Data

Apr. 30, 1993 [SE] Sweden .................................. 9301481
Jan. 7, 1994 [WO] WIPO ..................... PCT/SE94/00008

[51] Int. Cl.$^6$ ..................... B25T 9/04; B25T 18/00
[52] U.S. Cl. ................. 74/490.03; 414/917; 901/15
[58] Field of Search ..................... 74/490.01, 490.03; 414/680, 719, 917; 901/15, 22, 23, 48

[56] References Cited

U.S. PATENT DOCUMENTS

| | | | |
|---|---|---|---|
| 3,834,557 | 9/1974 | Devillers | 901/22 X |
| 4,378,959 | 4/1983 | Susnjara | 414/732 X |
| 4,725,178 | 2/1988 | Reis et al. | 414/4 |
| 5,423,648 | 6/1995 | Okeel et al. | 414/225 |

FOREIGN PATENT DOCUMENTS

| | | |
|---|---|---|
| 0361140 | 4/1990 | European Pat. Off. . |
| 0435285A1 | 3/1991 | European Pat. Off. . |
| 0489168A1 | 10/1992 | European Pat. Off. . |
| WO9313915 | 7/1993 | WIPO . |

*Primary Examiner*—Rodney H. Bonck
*Assistant Examiner*—Troy Grabow
*Attorney, Agent, or Firm*—Watson Cole Stevens Davis, P.L.L.C.

[57] ABSTRACT

The invention relates to an industrial robot with two lower robot arms directed upwards from a fixed robot stand, the robot arms at their lower end being pivotably journalled in the stand around horizontal axes and at their upper end being pivotably interconnected by a yoke in such a way that a four-bar linkage is formed. The linkage is provided with a first driving unit. An upper robot arm is journalled around a fifth axis in a fixing member which is supported by the yoke and which is rotatably journalled around a sixth axis. The upper robot arm and its fixing member are provided with a second and a third driving unit, respectively.

11 Claims, 5 Drawing Sheets

INDUSTRIAL ROBOT

This application is a continuation of application Ser. No. 08/194,476 filed Feb. 10, 1994.

TECHNICAL FIELD

The present invention relates to an industrial robot comprising two lower robot arms directed upward from a robot stand, which are each, at their lower end, pivotably journalled in the robot stand around one of two parallel and preferably horizontal lower pivotal axes and, at their upper end, pivotably interconnected by a yoke for rotation of each lower robot arm around one of two upper pivotal axes, parallel to the lower pivotal axes, the yoke connecting the two lower robot arms together to form a four-bar linkage, which supports an upper robot arm which is pivotably journalled around a fifth, preferably horizontal pivotal axis. For swing motion of the linkage and the upper robot arm, the robot is provided with a first and a second driving unit, respectively.

BACKGROUND ART

Industrial robots of the above-mentioned type are previously known from published European Patent applications 0435 285 and 0489 168. A drawback with these designs is that the swing motion in the lateral direction of the upper robot arm is brought about by rotatably journalling the robot stand, in which the lower robot arms are mounted, in a robot foot. This means that the robot requires relatively large space in the lateral direction, which is a disadvantage especially in such applications where it is desired to place several robots side-by-side to simultaneously carry out, for example, welding operations on an assembly line for manufacturing car bodies. Another drawback with these designs is that the upper robot arm is one-sidedly journalled, which is less suitable considering the stability and load-handling capacity of the robot.

It is also known, for example from published European patent application 0361 140, to design the upper robot arm pivotable in the lateral direction without the robot stand having to be pivotable. Hitherto known robot designs of this type, however, have a relatively limited operating range, since the upper robot arm cannot be pivoted in a vertical plane upwards/backwards. Therefore, such a robot cannot be used, for example, for fetching objects or carrying out operations on the rear side of the robot.

SUMMARY OF THE INVENTION

The object of the present invention is to provide an industrial robot of the type described in the introductory part of the description, which does not suffer from the above-mentioned drawbacks of comparable, previously known designs. The new robot design is intended to make possible a large operating range, a stable design (a high repetition accuracy), and a large handling capacity. In addition, it is intended to permit a plurality of robots of this design to be mounted relatively close to each other along an assembly line to simultaneously carry out, for example, welding operations on car bodies. A robot with these properties is achieved according to the invention.

In a robot according to the invention, the upper robot arm can be pivoted both in a vertical plane between forwardly and rearwardly extended positions of the upper arm, and in the lateral plane, without the robot stand having to be rotatable. This makes possible great flexibility with respect to location and current operating range. In addition, the design permits the upper robot arm to be journalled double-sidedly to achieve a high mechanical stability.

BRIEF DESCRIPTION OF THE DRAWINGS

The invention will be explained in greater detail by describing embodiments with reference to the accompanying drawings, wherein.

DESCRIPTION OF THE PREFERRED EMBODIMENTS

Figure 1:
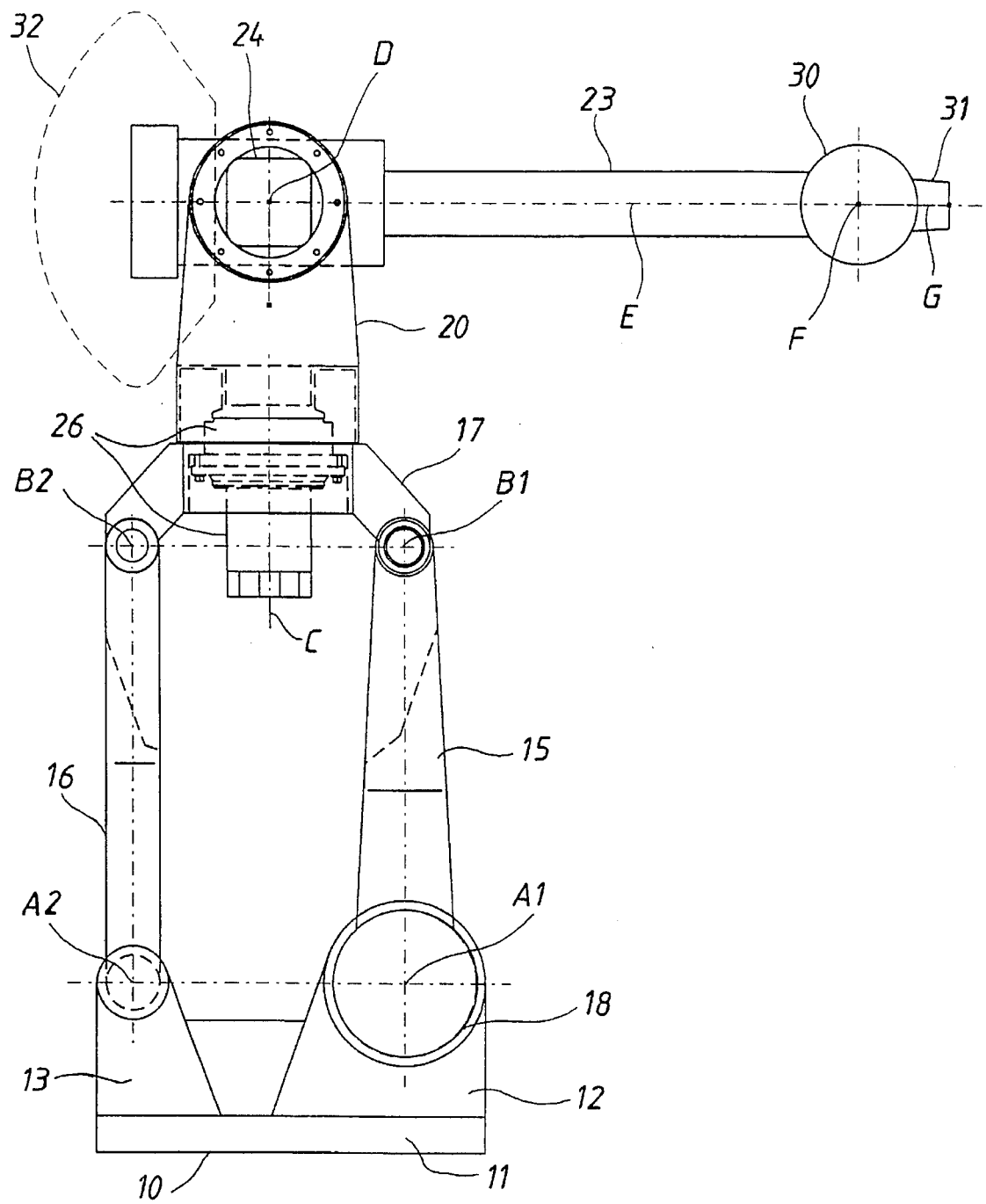
FIG. 1 is a side view of a first embodiment of an industrial robot according to the present invention.
Figure 2:
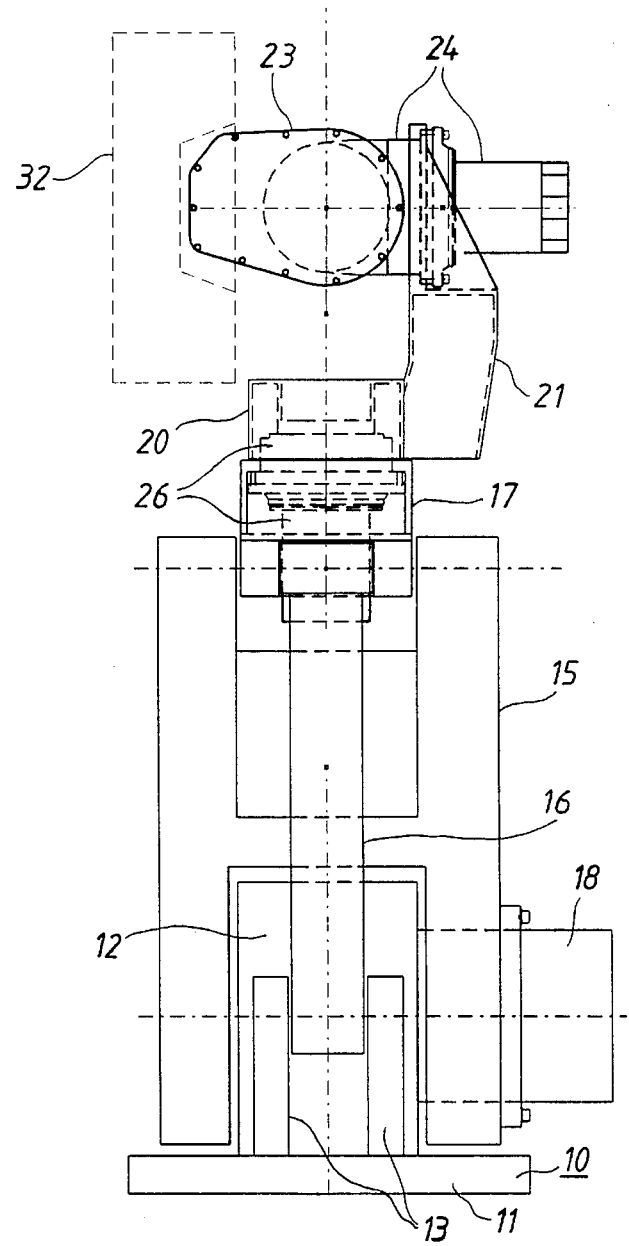
FIG. 2 is a rear view of the robot according to FIG. 1.
Figure 3:
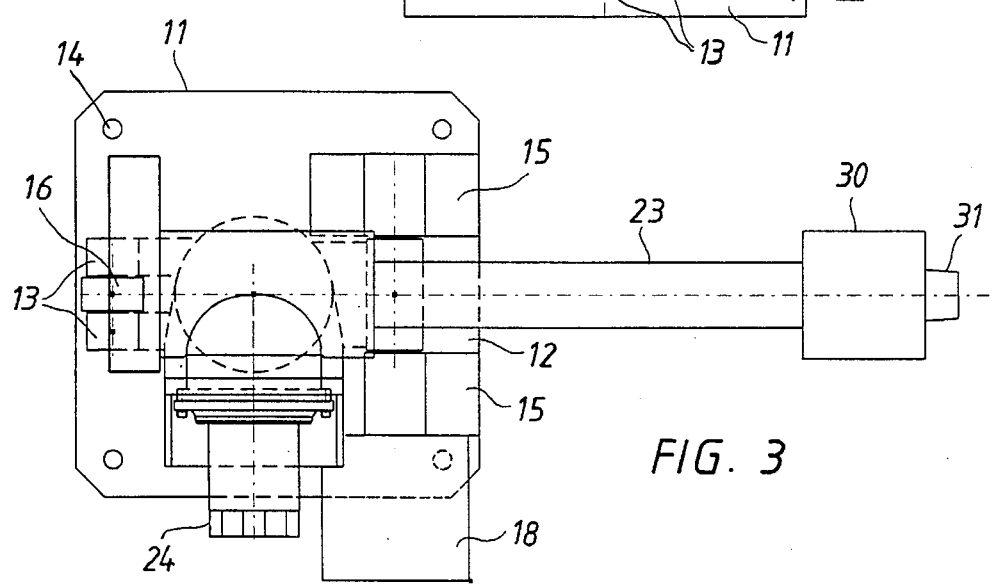
FIG. 3 is a view from above of the robot according to FIG. 1.

The industrial robot shown in FIGS. 1–3 is designed with a robot stand 10 comprising a base plate 11 and two bearing brackets 12 and 13 directed upwardly from the base plate. The base plate is provided with a number of fixing holes 14 for securing the robot to a foundation. From the stand 10 there rise two lower robot arms 15 and 16 arranged in parallel. The two arms 15 and 16 are each pivotably journalled, at the lower end, to one of the bearing brackets 12 and 13, respectively, of the stand, the first arm 15 being pivotable around a first horizontal pivot axis A1, the second arm 16 being pivotable around a second horizontal pivot axis A2 which is parallel to the first axis A1. The two parallel lower arms 15 and 16 are interconnected, at their upper end, by a yoke 17 for rotation of each arm around one of two upper pivot axes B1 and B2 which are parallel to the lower pivot axes A1, A2. The yoke 17 connects the two arms 15 and 16 together and forms together with these arms a parallelogrammic linkage. The swing motion of the parallelogrammic linkage is achieved with the aid of a first driving unit 18 which is mounted on the bearing bracket 12 and comprises a driving motor with a reduction gear. The output shaft of the driving unit 18 is connected to the above-mentioned first arm 15 for swing motion thereof around the axis A1.

The yoke 17 of the parallelogrammic linkage supports a fixing member 20, which is rotatably journalled around a vertical pivot axis C and has an upwardly directed support arm 21 in which an upper robot arm 23 is pivotably journalled around a fifth horizontal pivot axis D. The pivoting of the upper arm 23 around the horizontal axis D is achieved with the aid of a second driving unit 24, secured to the support arm 21 of the fixing member and comprising of a driving motor with a reduction gear. In the embodiment shown, the upper arm 23 is fixed to the output driving shaft of the second driving unit 24, this driving shaft being coaxial with the fifth horizontal pivot axis D. The gear of the second driving unit 24 is in this case a so-called compact gear which comprises the necessary bearing members for the upper arm 23.

The rotation of the fixing member 20 of the upper arm around the vertical pivot axis C is achieved with the aid of a third driving unit 26 secured to the yoke 17 and comprising a driving motor with a reduction gear.

The fixing member 20 is fixed to the output shaft of the third driving unit 26, this shaft being coaxial with the vertical pivot axis C and the bearing of this shaft also constituting a bearing for the fixing member 20.

The pivot axes C and D need not necessarily intersect each other.

The front part of the upper robot arm 23 is rotatable about a rotary axis E, defining a seventh pivot axis coaxial with the longitudinal axis of the arm. The outer end portion of the arm comprises a wrist which comprises a wrist part 30 which is rotatable about an axis F and has a tool attachment 31, which is rotatable about an axis G. Drive devices for the robot parts rotatable about the axes E, F and G are arranged inside or adjacent to the upper robot arm 23. At the rear end of this arm, a counterweight 32 may possibly be arranged.

Figure 4:
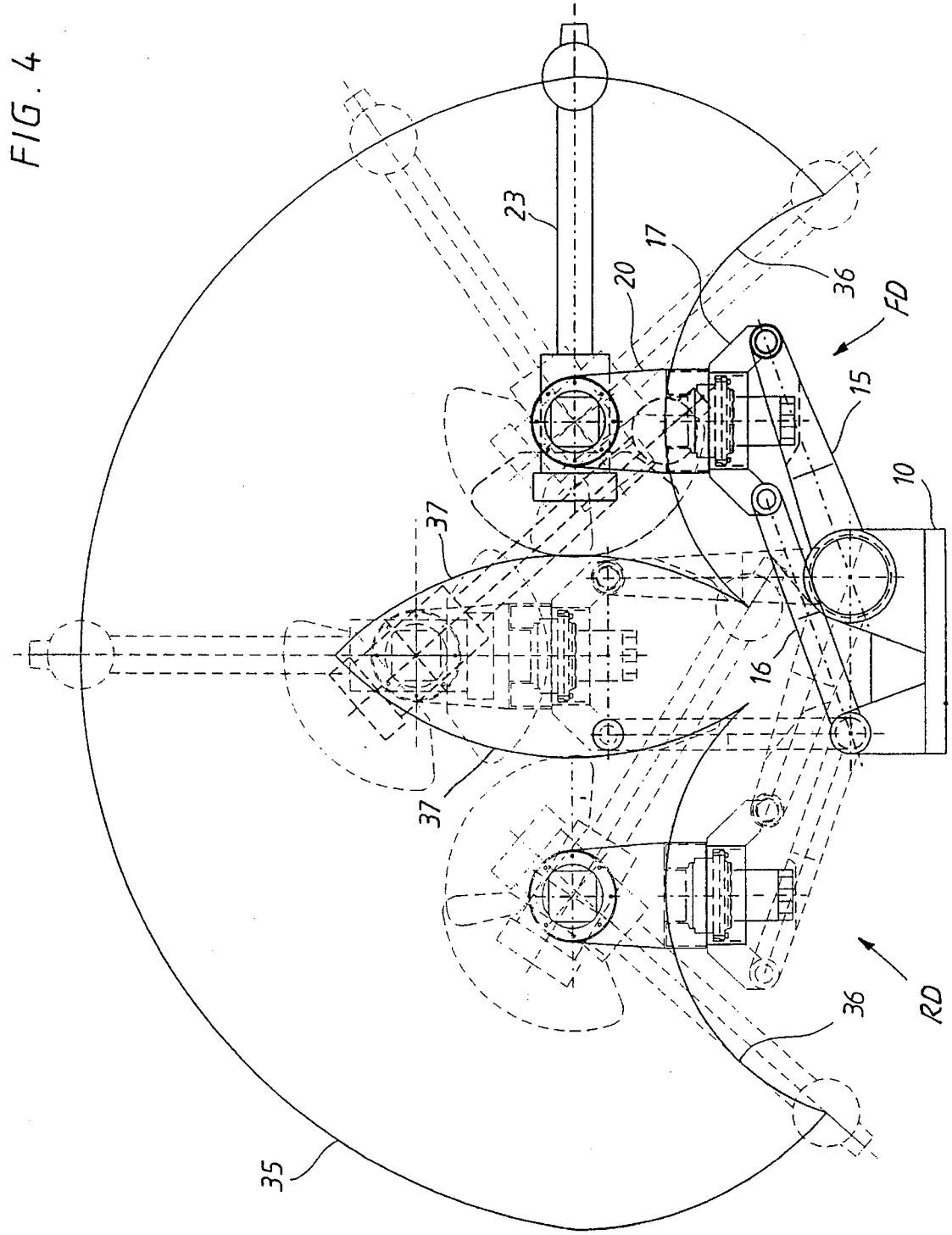
FIG. 4 shows the robot in different possible operating positions as well as the operating range of the robot in a vertical plane with the upper robot arm in a certain rotational position around a vertical axis.

FIG. 4 shows the operating range of the robot in a vertical plane when the fixing member 20 is in such a rotational position that the vertical pivotal plane of the upper robot arm 23 coincides with or is parallel to the pivotal plane of the parallelogrammic linkage 15, 16, 17. The operating range is limited by the curves 35, 36, 37.

In accordance with the foregoing arrangement, it can be seen that first driving unit 18 pivots the linkage to effect maximum movement of yoke 17 in a forward direction (shown in position FD in FIG. 4), and to effect movement of yoke 17 in a rearward direction (shown in position RD in FIG. 4).

Second driving unit 24 pivots upper robot arm 23 about fifth axis D between the maximum forward reach of upper arm 24 (shown in solid outline in FIG. 4) at the maximum forward direction of movement FD of the yoke, and a maximum rearward reach of upper arm 23 (when extending in FIG. 4 in a direction opposite or through 180° from that shown in solid outline in FIG. 4) at the maximum rearward direction of movement RD of yoke 17.

Figure 5:
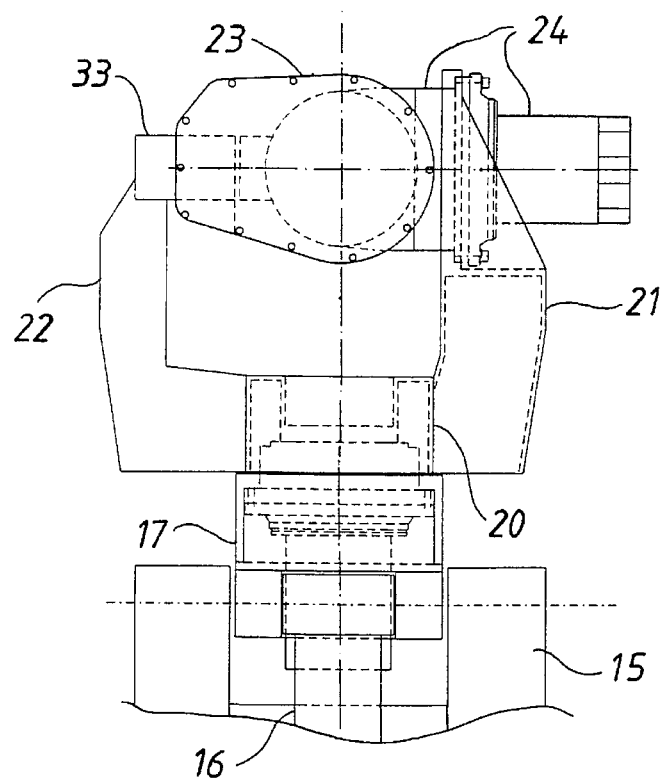
FIG. 5 is a rear view of the upper part of a robot according to a second embodiment of the invention.
Figure 6:
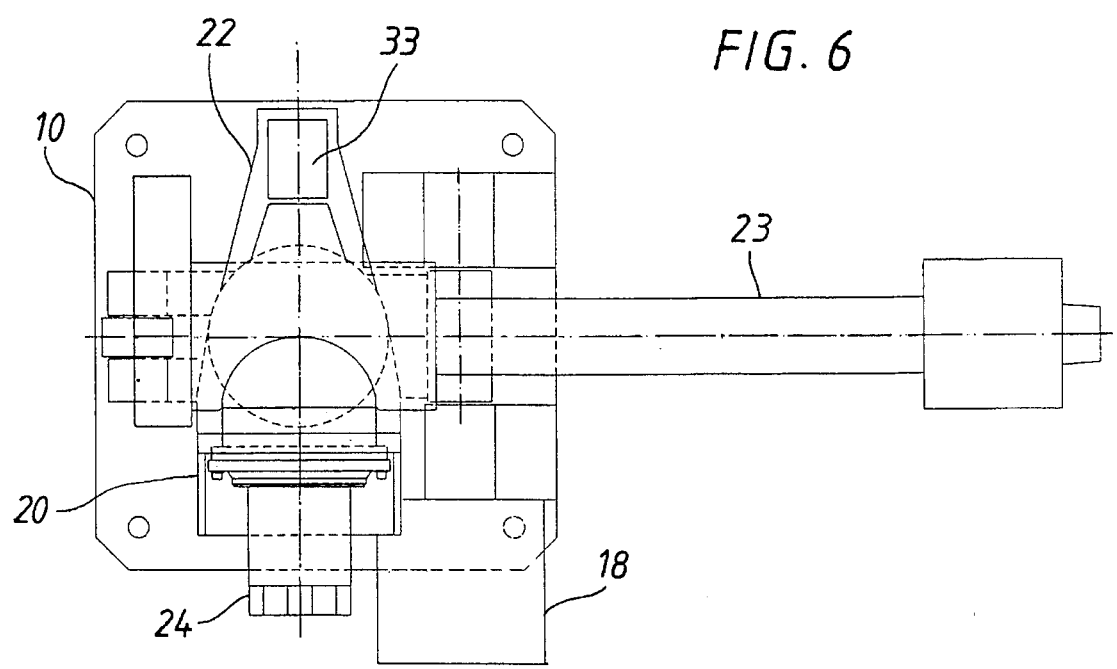
FIG. 6 is a view from above of the robot according to FIG. 5.

FIGS. 5 and 6 show an alternative embodiment which differs from that shown in FIGS. 1–3 in that the upper robot arm 23 is double-sidedly journalled. This has been achieved by designing the fixing member 20 with a second upwardly directed supporting arm 22, which supports a support bearing 33 coaxial with the horizontal pivotal axis D.

Figure 7:
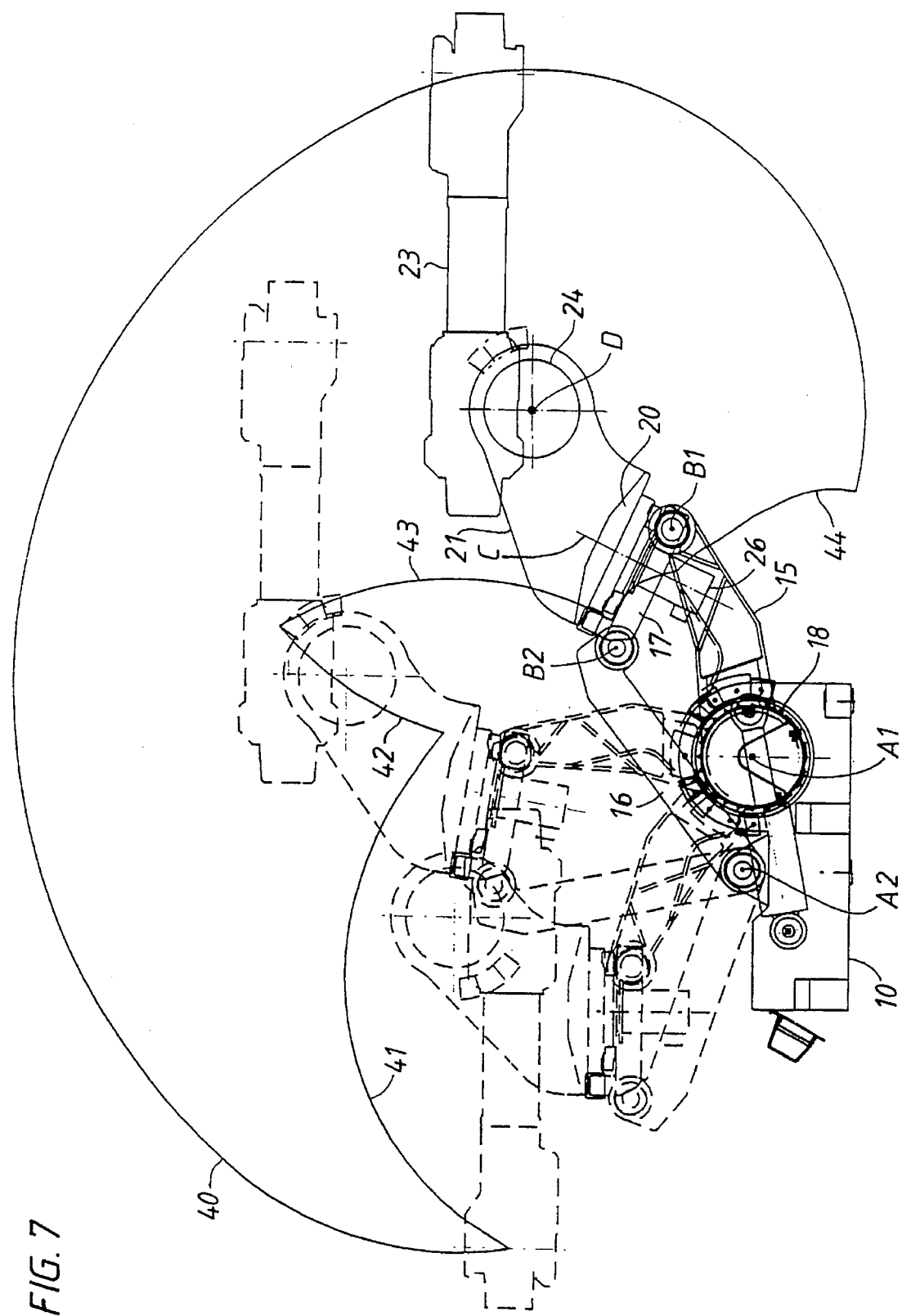
FIG. 7 is a side view of a robot according to a third embodiment of the invention, and the operating range of this robot in the same way as in FIG. 4.

The four-bar linkage need not necessarily be designed as a parallelogram. FIG. 7 shows an embodiment where all the links of the linkage have different lengths and where the sixth pivot axis C is inclined in relation to the vertical direction. With such a design, the operating range of the robot can be modified and especially desirable ranges be obtained. The effective link lengths A1–A2, B1–B2, A1–B1 and A2–B2 may, for example, be 380, 440, 800 and 810 mm, respectively. With the robot according to FIG. 7, the operating range marked by the curves 40, 41, 42, 43, 44 is obtained when the fixing member 20 is in the same rotational position as in FIG. 4.

According to this embodiment of the invention, as can be seen in FIG. 7, yoke 17 is tilted through a predetermined angle downwardly from a horizontal plane in the forward direction FD as the result of the aforenoted difference in link lengths. For example, with the length of the forward lower arm 15 being shorter compared to the length of rearward lower arm 16, the forward reach of upper robot arm 23 is extended in the vertical plane beyond that arrangement in which the linkage is a parallelogrammic.

In the embodiment shown in FIG. 7, the pivotal axis C coincides with a normal to a plane through the pivotal axes B1 and B2. However, the invention is not limited to this design, but the axis C can also be arranged at an angle to this normal. This angle may suitably be within the range 0°–40°.

Furthermore, the pivotal axis C need not be perpendicular to the pivotal axes A1, A2, B1, B2 of the link device, but for certain applications it may be advantageous to arrange the axis C inclined in relation to these axes. (The angle between two lines which do not lie in the same plane, so-called crossing lines, here means, in accordance with conventional space-geometrical concepts, the angle between two intersecting lines which are parallel to the crossing lines.) Nor is it absolutely necessary for the axis C to lie between the axes B1 and B2, but the axis C can also be arranged outside these axes on an extension of the yoke 17.

Also other modifications of the invention are possible within the scope of the claims. For example, the upper arm 23 and the rotatable fixing member 20 of the arm need not be fixed to the output shaft of the respective driving unit, but the arm and the fixing member may be provided with bearings in the fixing member and the yoke, respectively, which are separate from the driving units, whereby the output shafts of the driving units 24 and 26 need not necessarily coincide with the pivotal axes D and C, respectively.

In the embodiment described above, the positions of the different axes and the robot parts are related to an embodiment in which the robot is arranged on a horizontal base. However, the invention is not limited to this mounting, but also other suitable mountings can be applied, for example suspension mounting or lateral mounting.

I claim:

1. An industrial robot comprising, a pair of spaced apart lower robot arms upwardly extending from a robot stand, lower ends of said arms being respectively journalled in said stand for pivotal movement about a pair of parallel lower pivot axes, upper ends of said arms being rotatably interconnected by a yoke for rotating said lower robot arms respectively about a pair of upper pivot axes lying parallel to said lower pivot axes, said yoke interconnecting said robot arms together to form a four-bar linkage with said stand, a first driving unit for pivoting the linkage to effect maximum movement of said yoke in forward and rearward directions in a vertical plane, an upper robot arm supported by the linkage and being journalled for pivotal movement about a fifth pivot axis in the vertical plane, a second driving unit for pivoting said upper arm about said fifth axis between a maximum forward reach of said upper arm at the maximum forward direction of movement of said yoke, and a rearward reach of said upper arm rotated through 180° at any position of said yoke without the need to rotate said upper arm about a sixth pivot axis, said upper robot arm being mounted on a fixing member supported by said yoke, said fixing member being rotatably journalled for movement about said sixth pivot axis, and a third driving unit secured to the yoke and connected to the fixing member for rotation thereof about said sixth axis, said upper robot arm having an outer end portion including a wrist mechanism.

2. The robot according to claim 1, wherein said upper pivot axes are spaced apart a distance equal to a spaced apart distance between said lower pivot axes, and wherein said lower robot arms are of equal length, wherein said linkage is in the form of a parallelogram.

3. The robot according to claim 1, wherein the spacing between said upper pivot axes and the spacing between said lower pivot axes are unequal.

4. The robot according to claim 1, wherein the spacing between one of said upper and lower pivot axes of one of said lower arms and the spacing between the other of said upper and lower pivot axes of the other of said lower arms are unequal.

5. The robot according to claim 1, wherein a forward one of said lower arms has a shorter length compared to that of a rearward one of said lower arms for tilting said yoke through a predetermined angle downwardly from a horizontal plane in said forward direction for extending the forward reach of said upper arm in the vertical plane.

6. The robot according to claims 1, 2, 3, 4 or 5, wherein said second driving unit is secured to said fixing member for the upper robot arm and has an output shaft on which the upper arm is fixed.

7. The robot according to claims 1, 2, 3, 4 or 5, wherein said sixth pivot axis forms an oblique angle with a normal to a plane through said upper pivot axes.

8. The robot according to claims 1 or 2, wherein said fifth pivot axis intersects with said sixth pivot axis.

9. The robot according to claims 1, 3 or 4, wherein said fifth pivot axis is spaced from said sixth pivot axis so as not to intersect therewith.

10. The robot according to claims 1, 2, 3, 4 or 5, wherein said fixing member comprises a pair of spaced upwardly directed supporting arms located on opposite sides of said upper robot arm for double-sided mounting of said upper arm.

11. The robot according to claim 1, wherein said outer end portion is rotatable about a seventh pivot axis coaxial with the longitudinal axis of said upper arm.

* * * * *